(12) United States Patent  
Kikuchi et al.

(10) Patent No.: US 9,991,809 B2  
(45) Date of Patent: Jun. 5, 2018

(54) INSULATION-TYPE SYNCHRONOUS DC/DC CONVERTER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD, Ukyo-Ku, Kyoto (JP)

( * ) Notice: Subject to any disclaimer, the term of this patent is extended or adjusted under 35 U.S.C. 154(b) by 31 days.

(21) Appl. No.: 14/814,966

(22) Filed: Jul. 31, 2015

(65) Prior Publication Data

US 2016/0036340 A1    Feb. 4, 2016

(30) Foreign Application Priority Data

Aug. 1, 2014    (JP) ................... 2014-158075  
May 28, 2015    (JP) ................... 2015-108898

(51) Int. Cl.
   *H02M 3/335*      (2006.01)
   *H02M 1/32*      (2007.01)
   *H02M 1/00*      (2006.01)

(52) U.S. Cl.
CPC ......... *H02M 3/33592* (2013.01); *H02M 1/32* (2013.01); *H02M 2001/0025* (2013.01); *Y02B 70/1475* (2013.01)

(58) Field of Classification Search
CPC ............ H02M 3/22; H02M 3/24; H02M 3/28; H02M 3/325; H02M 3/335;

(Continued)

(56) References Cited

U.S. PATENT DOCUMENTS 5,747,982 A    5/1998    Dromgoole et al.  
6,088,244 A    7/2000    Shioya et al.

(Continued)

FOREIGN PATENT DOCUMENTS

CN    101471609 A    7/2009  
CN    101599701 A    12/2009

(Continued)

OTHER PUBLICATIONS

U.S. Non-Final Office Action corresponding to U.S. Appl. No. 15/057,522; dated Dec. 16, 2016.

(Continued)

*Primary Examiner* — Timothy J Dole  
*Assistant Examiner* — Carlos Rivera-Perez  
(74) *Attorney, Agent, or Firm* — Cantor Colburn LLP

(57) ABSTRACT

The feedback IC is provided at the secondary side of the DC/DC converter and is coupled to the photo coupler. The error amplifier amplifies an error between a voltage detection signal according to an output voltage of the DC/DC converter and a target voltage, and draws a current according to the error from the input side of the feedback photo coupler via the photo coupler connection terminal. The abnormal detection circuit asserts an abnormal detection signal when an abnormal condition in a secondary side of the DC/DC converter is detected. The protection circuit is coupled to the photo coupler connection terminal, and acts on the feedback photo coupler via the photo coupler connection terminal so that a feedback operation by the error amplifier is invalid and an on-period of the switching transistor is shorten.

18 Claims, 12 Drawing Sheets

(58) Field of Classification Search
CPC ......... H02M 3/33507; H02M 3/33515; H02M 3/33523; H02M 3/33538; H02M 3/33592; H02M 3/33546; H02M 3/33553; H02M 1/32; H02M 1/325; H02M 1/327; H02M 1/36; H02M 2001/0025; Y02B 70/1475
USPC ..... 363/15–21.18, 37, 40–48, 50–58, 95–99, 363/106, 108, 109, 123–134, 147; 323/205–211, 222–226, 271–278, 280, 323/282–288, 351, 902, 907, 909; 361/18, 78, 79, 88–103, 106
See application file for complete search history.

(56) References Cited

U.S. PATENT DOCUMENTS

| | | | |
|---|---|---|---|
| 6,456,511 B1* | 9/2002 | Wong | H02M 1/36 363/21.13 |
| 6,980,443 B2* | 12/2005 | Nagano | H02M 3/33523 363/21.12 |
| 8,520,415 B1 | 8/2013 | Krishnamoorthy et al. | |
| 9,041,378 B1* | 5/2015 | Lam | H02M 3/156 323/271 |
| 2003/0039129 A1 | 2/2003 | Miyazaki et al. | |
| 2007/0040516 A1 | 2/2007 | Chen | |
| 2007/0097714 A1 | 5/2007 | Cebry | |
| 2007/0103946 A1 | 5/2007 | Kyono | |
| 2007/0139837 A1* | 6/2007 | Usui | H02M 1/32 361/91.1 |
| 2008/0073974 A1 | 3/2008 | Madigan | |
| 2008/0123378 A1 | 5/2008 | Chiang | |
| 2008/0247194 A1 | 10/2008 | Ying et al. | |
| 2009/0109712 A1 | 4/2009 | Hsu | |
| 2011/0018590 A1 | 1/2011 | Tai et al. | |
| 2011/0085354 A1 | 4/2011 | Wang et al. | |
| 2011/0102411 A1 | 5/2011 | Chang et al. | |
| 2011/0157926 A1 | 6/2011 | Adragna | |
| 2013/0107585 A1 | 5/2013 | Sims et al. | |
| 2013/0301310 A1 | 11/2013 | Wang et al. | |
| 2013/0301311 A1 | 11/2013 | Wang et al. | |
| 2014/0016362 A1 | 1/2014 | Adragna et al. | |
| 2014/0071715 A1 | 3/2014 | Sato et al. | |
| 2014/0204625 A1 | 7/2014 | Liu et al. | |
| 2014/0254206 A1 | 9/2014 | Ou et al. | |
| 2014/0293658 A1 | 10/2014 | Cao et al. | |
| 2015/0103567 A1* | 4/2015 | Wang | H02M 3/33592 363/21.13 |
| 2016/0036340 A1 | 2/2016 | Kikuchi et al. | |
| 2016/0261202 A1* | 9/2016 | Kikuchi | H02M 3/33523 |

FOREIGN PATENT DOCUMENTS

| | | |
|---|---|---|
| CN | 101620012 A | 1/2010 |
| JP | H08185232 A | 7/1996 |
| JP | H09163736 A | 6/1997 |
| JP | 2009005461 A | 1/2009 |
| JP | 2010074959 A | 4/2010 |
| JP | 2014138457 A | 7/2014 |

OTHER PUBLICATIONS

USPTO Final Office Action for corresponding U.S. Appl. No. 15/057,522; dated Jun. 23, 2017.
SIPO First Office Action with CN Search Report for corresponding CN Application No. 201510462893.6; dated Aug. 11, 2017.
USPTO Notice of Allowance corresponding to U.S. Appl. No. 14/814,954; dated May 4, 2016.
U.S. Non-Final Office Action corresponding to U.S. Appl. No. 15/057,522; dated Oct. 20, 2017.
SIPO Second Office Action for corresponding CN Application No. 201510462893.6; dated Mar. 14, 2018.
JP Notification of Reasons for Refusal corresponding to Application No. 2014-158074; dated Mar. 26, 2018.

* cited by examiner

INSULATION-TYPE SYNCHRONOUS DC/DC CONVERTER

This application is based upon and claims the benefit of priority from the prior Japanese Patent Application No. 2014-158075, filed Aug. 1, 2014 and Japanese Patent Application No. 2015-108898, filed May 28, 2015, the entire contents of which are incorporated herein by reference.

BACKGROUND OF THE INVENTION

Field of the Invention

The present invention relates to a DC/DC converter.

Description of the Related Art

Various kinds of home appliances such as TVs, refrigerators etc., each receive externally applied commercial AC electric power for its operation. Also, electronic devices such as laptop computers, cellular phone terminals, and tablet devices are each configured to operate using commercial AC electric power, and/or to be capable of charging a built-in battery using the commercial AC electric power. Such home appliances and electronic devices (which will collectively be referred to as "electronic devices" hereafter) each include a built-in power supply apparatus (converter) configured to convert the commercial AC voltage to DC voltage. Alternatively, such a converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via an unshown fuse and an unshown input capacitor. The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating stabilized DC voltage $V_{IN}$.

The insulation-type DC/DC converter 200r receives the DC voltage $V_{IN}$ at its input terminal P1, steps down the DC voltage $V_{IN}$ and supplies an output voltage $V_{OUT}$ stabilized to the target value to a load (not shown) connected to its output terminal P2.

The DC/DC converter 200r includes a primary controller 202, a photo coupler 204, a shunt regulator 206, an output circuit 210, and additional circuit components. The output circuit 210 includes a transformer T1, a diode D1, an output capacitor C1, and a switching transistor M1. The output circuit 210 has a conventional topology, and accordingly, detailed description thereof will be omitted.

With the switching operation of the switching transistor M1, the input voltage $V_{IN}$ is stepped down, and the output voltage $V_{OUT}$ is generated. The controller 202 adjusts the duty ratio of the switching operation of the switching transistor M1 so as to regulate the output voltage $V_{OUT}$ to the target value.

The output voltage $V_{OUT}$ of the DC/DC converter 200r is divided by the resistors R1 and R2. The shunt regulator 206 amplifies an error between the divided voltage (voltage detection signal) $V_s$ and a predetermined reference voltage $V_{REF}$, and draws (sinks) an error current $I_{ERR}$ according to the error from the light emitting device (LED) of the photo coupler 204.

Accordingly, a feedback current $I_{FB}$ flows through the light receiving device (photo transistor) of the photo coupler 204, which corresponds to the error current $I_{ERR}$ at the secondary side. The feedback current $I_{FB}$ is smoothed by a resistor and a capacitor, and is supplied to a feedback (FB) terminal of the controller 202. The controller 202 adjusts the duty cycle of the switching transistor M1 according to a feedback voltage $V_{FB}$ at the FB terminal.

In the insulation type DC/DC converter, an abnormal condition such as an over voltage condition, an overheated condition (thermal abnormal condition), an over current condition may occur in both of the primary side and the secondary side. However, the circuit in FIG. 1 has no function for detecting the abnormal condition in the secondary side, and there is no protection function for the abnormal condition in the secondary side.

SUMMARY OF THE INVENTION

The present invention has been made in order to solve such a problem. Accordingly, it is an exemplary purpose of the present invention to provide a DC/DC converter with functions for detecting the secondary side abnormality and for protecting the circuit in the abnormal condition.

An embodiment of the present invention relates to a feedback circuit provided on a secondary side of an insulation-type synchronous DC/DC converter. The insulation-type synchronous DC/DC converter includes: a transformer having a primary winding and a secondary winding; a switching transistor coupled to the primary winding of the transformer; a synchronous rectifier transistor coupled to the secondary winding of the transformer; a feedback photo coupler; a primary controller coupled to an output side of the feedback photo coupler, and structured to control the switching transistor according to a feedback signal from the feedback photo coupler; a synchronous rectifier controller that controls the synchronous rectifier transistor; and the feedback circuit coupled to an input side of the feedback photo coupler. The feedback circuit includes: a photo coupler connection terminal coupled to the input side of the feedback photo coupler; an error amplifier structured to amplify an error between a voltage detection signal according to an output voltage of the DC/DC converter and a target voltage, and to draw a current according to the error from the input side of the feedback photo coupler via the photo coupler connection terminal; an abnormal detection circuit structured to assert an abnormal detection signal when an abnormal condition in a secondary side of the DC/DC converter is detected; and a protection circuit coupled to the photo coupler connection terminal, and structured to act on the feedback photo coupler via the photo coupler connection terminal so that a feedback operation by the error amplifier is invalid and an on-period of the switching transistor is shorten, and wherein the feedback circuit is packaged in a single module.

With such an embodiment, by integrating the abnormal detection circuit with the feedback circuit having the error amplifier, the abnormal condition in the secondary side of the DC/DC converter can be detected. When the abnormal condition is detected, the protection circuit invalidates the voltage feedback with the error amplifier and the duty ratio of the switching transistor is decreased. Then power supplied to the secondary side is reduced and the circuit is protected. Further, instead of the shunt regulator configured as a discrete device, the error amplifier integrated on a semiconductor chip allows to reduce a power consumption.

In one embodiment, the error amplifier may comprise: a differential amplifier that amplifies an error between the voltage detection signal and the target voltage; and a first output transistor having a base/a gate receiving an output signal of the differential amplifier, an emitter/a source connected to the ground, and a collector/a drain connected to the photo coupler connection terminal. The protection circuit may include a second output transistor having a base/a gate receiving the abnormal detection signal, an emitter/a source connected to the ground, and a collector/a drain connected to the photo coupler connection terminal.

In one embodiment, the feedback circuit may further comprise an over current protection circuit structured to amplify an error between a current detection signal according to a secondary current flowing in the secondary side of the DC/DC converter and an upper limit level of the current detection signal, and to draw a current according to the error from the input side of the feedback photo coupler via the photo coupler connection terminal. This provides the over current protection using a voltage feedback path.

In one embodiment, the over current protection circuit may have the same structure as the error amplifier. This provides a drooping characteristic in the over current protection.

The abnormal detection circuit may be structured to detect at least one of an over voltage condition and an overheated condition in the secondary side.

In one embodiment, the feedback circuit may further comprises: a diode provided between the collector/the drain of the first output transistor and the photo coupler connection terminal; and an internal regulator coupled to receive a voltage at the photo coupler connection terminal and to generate an internal power supply voltage.

Such an embodiment allows to maintain the voltage at the photo coupler connection terminal over the zener voltage of the diode regardless of the feedback condition or the abnormal condition, and the internal power supply voltage can be stabilized.

Another embodiment of the present invention relates to an insulation-type synchronous DC/DC converter. The insulation-type synchronous DC/DC converter includes: a transformer having a primary winding and a secondary winding; a switching transistor coupled to the primary winding of the transformer; a synchronous rectifier transistor coupled to the secondary winding of the transformer; a feedback photo coupler; a primary controller coupled to an output side of the feedback photo coupler, and structured to control the switching transistor according to a feedback signal from the feedback photo coupler; a synchronous rectifier controller that controls the synchronous rectifier transistor; and the aforementioned feedback circuit coupled to an input side of the feedback photo coupler.

Another embodiment of the present invention relates to a synchronous rectifier controller provided on a secondary side of an insulation-type synchronous DC/DC converter. The insulation-type synchronous DC/DC converter comprises: a transformer having a primary winding and a secondary winding; a switching transistor coupled to the primary winding of the transformer; a synchronous rectifier transistor coupled to the secondary winding of the transformer; a photo coupler; and a primary controller coupled to an output side of the photo coupler, and structured to control the switching transistor according to a feedback signal from the photo coupler. The synchronous rectifier controller comprises: a driver circuit coupled to drive the synchronous rectifier transistor; a photo coupler connection terminal coupled to the input side of the photo coupler; an error amplifier structured to amplify an error between a voltage detection signal according to an output voltage of the DC/DC converter and the target voltage, and to draw a current according to the error from the input side of the photo coupler via the photo coupler connection terminal; an abnormal detection circuit structured to assert an abnormal detection signal when an abnormal condition in a secondary side of the DC/DC converter is detected; and a protection circuit coupled to the photo coupler connection terminal, and structured to act on the photo coupler via the photo coupler connection terminal so that a feedback operation by the error amplifier is invalid and an on-period of the switching transistor is shorten. The synchronous rectifier controller is packaged in a single module.

With such an embodiment, by integrating the abnormal detection circuit and the error amplifier on the synchronous rectifier controller, the abnormal condition in the secondary side of the DC/DC converter can be detected. When the abnormal condition is detected, the protection circuit invalidates the voltage feedback with the error amplifier and the duty ratio of the switching transistor is decreased. Then a power supplied to the secondary side is reduced and the circuit is protected. Further, instead of the shunt regulator configured as a discrete device, the error amplifier integrated on a semiconductor chip allows to reduce a power consumption.

In one embodiment, a power supply plane of a set of the abnormal detection circuit and the error amplifier and a power supply plane of the driver circuit may be isolated each other, and a ground plane of the set of the abnormal detection circuit and the error amplifier and a ground plane of the driver circuit may be isolated each other.

Such an embodiment may support the circuit topology where the synchronous rectifier transistor is disposed at a higher voltage side of the secondary winding (output terminal side).

In one embodiment, the synchronous rectifier transistor may be provided at a high voltage side of the secondary winding. The transformer may further comprises an auxiliary winding provided at a secondary side of the transformer. The DC/DC converter may be structured to generate, by using the auxiliary winding, an external power supply voltage with reference to a voltage potential at a line connecting the synchronous rectifier transistor to the secondary winding. The ground plane of the driver circuit may be supplied with the voltage potential at the line, and the power supply plane of the driver circuit may be supplied with the external power supply voltage.

In one embodiment, the power supply plane of the set of the error amplifier and the abnormal detection circuit may be supplied with an internal power supply voltage which is generated from a voltage at the photo coupler connection terminal, and the ground plane of the set of the error amplifier and the abnormal detection circuit may be supplied with a ground voltage at the secondary side of the DC/DC converter.

In another embodiment, an insulation-type synchronous DC/DC converter is provided. The insulation-type synchronous DC/DC converter comprises: a transformer having a primary winding and a secondary winding; a switching transistor coupled to the primary winding of the transformer; a synchronous rectifier transistor coupled to the secondary winding of the transformer; an output capacitor; a photo coupler; the aforementioned synchronous rectifier controller structured to control the synchronous rectifier transistor and to drive the photo coupler with a current according to an error between the voltage at the output capacitor and a target voltage; and a primary controller coupled to an output side of the photo coupler, and structured to control the switching transistor according to a feedback signal from the photo coupler.

Another embodiment also relates to an insulation-type synchronous DC/DC converter. The insulation-type synchronous DC/DC converter comprises: a transformer having a primary winding and a secondary winding; a switching transistor coupled to the primary winding of the transformer; a synchronous rectifier transistor coupled to the secondary winding of the transformer; a photo coupler; a primary controller coupled to an output side of the photo coupler, and structured to control the switching transistor according to a feedback signal from the photo coupler; a driver circuit coupled to drive the synchronous rectifier transistor; an error amplifier structured to amplify an error between a voltage detection signal according to an output voltage of the DC/DC converter and a target voltage, and to draw a current according to the error from the input side of the photo coupler via the photo coupler connection terminal; an abnormal detection circuit structured to assert an abnormal detection signal when an abnormal condition in a secondary side of the DC/DC converter is detected; and a protection circuit structured to act on the photo coupler so that a feedback operation by the error amplifier is invalid and an on-period of the switching transistor is shorten.

In one embodiment, the DC/DC converter may be a flyback converter. In one embodiment, the DC/DC converter may be a forward converter.

Yet another embodiment of the present invention relates to a power supply apparatus (AC/DC converter). The power supply apparatus comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to a load.

Yet another embodiment of the present invention relates to an electronic device. The electronic device comprises: a load; a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to the load.

Yet another embodiment of the present invention relates to a power supply adapter. The power supply adapter comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage so as to generate the DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 2:
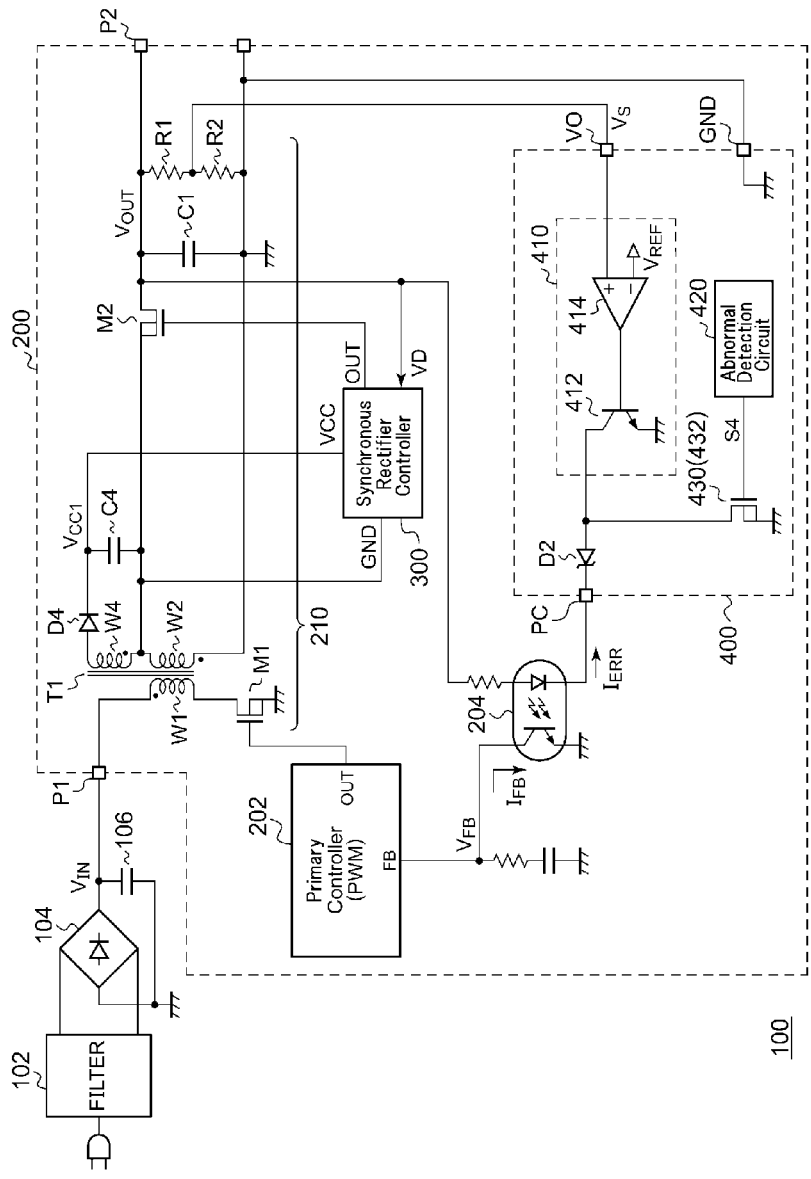
FIG. 2 is a circuit diagram of an AC/DC converter according to a first embodiment.

FIG. 2 is a circuit diagram of an AC/DC converter 100 according to a first embodiment. The AC/DC converter 100 includes a filter 102, a rectifier circuit 104, a smoothing capacitor 106, and an insulation-type DC/DC converter 200.

The DC/DC converter 200 includes a primary controller 202, a photo coupler 204, an output circuit 210, and a synchronous rectifier controller 300. The output circuit 210 has a topology of a synchronous flyback converter, and includes a transformer T1, a switching transistor M1 coupled to a primary winding W1, a synchronous rectifier transistor M2 coupled to a secondary winding W2, and an output capacitor C1. In this embodiment, the synchronous rectifier transistor M2 is provided at a higher voltage side of the secondary winding of the transformer T1 (output terminal P2 side).

An auxiliary winding W4 of the transformer T1, a diode D4 and a capacitor C4 generate an external power supply voltage $V_{CC1}$ with reference to the source of the synchronous rectifier transistor M2. The synchronous rectifier controller 300 is provided on the secondary side of the DC/DC converter 200, and controls the switching operation of the synchronous rectifier transistor M2. The external power supply voltage $V_{CC1}$ is supplied to the power supply (VCC) terminal of the synchronous rectifier controller 300. The ground (GND) terminal of the synchronous rectifier controller 300 is coupled to the source of the synchronous rectifier transistor M2. The drain (VD) terminal of the synchronous rectifier controller 300 is supplied with the drain voltage $V_D$ of the synchronous rectifier transistor M2. The output (OUT) terminal is coupled to the gate of the synchronous rectifier transistor M2. The synchronous rectifier transistor M2 may be built-in inside the synchronous rectifier controller 300.

The control method of the synchronous rectifier transistor M2 by the synchronous rectifier controller 300 is not limited. For example, the synchronous rectifier controller 300 may generate a pulse signal according to at least a voltage across the synchronous rectifier transistor M2, i.e. the drain-source voltage $V_{DS}$, and drive the synchronous rectifier transistor M2 according to the pulse signal.

Figure 5:
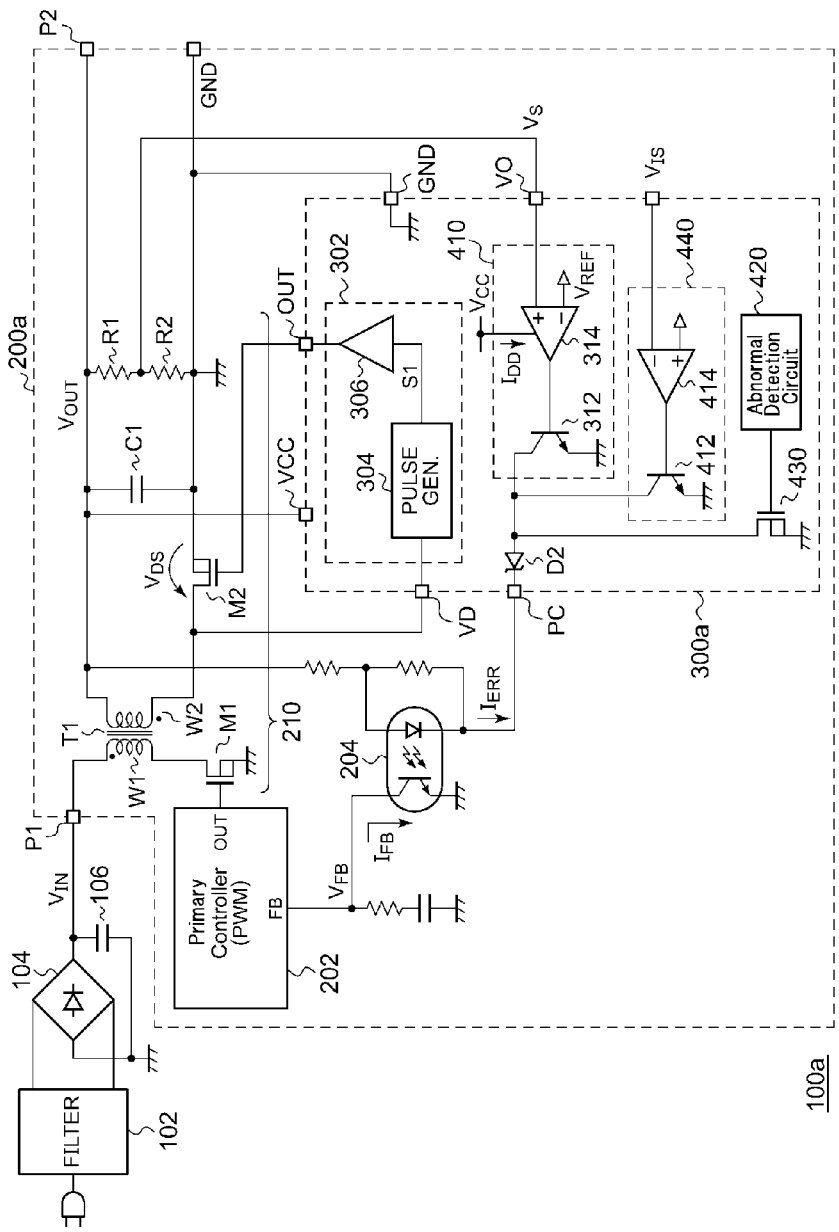
FIG. 5 is a circuit diagram of an AC/DC converter according to a second embodiment.

In one embodiment, synchronous rectifier controller 300 includes a driver circuit and a pulse generator (not shown in FIG. 2, shown as 306 and 304 in FIG. 5). The pulse generator may generate the pulse signal based on the drain-source voltage $V_{DS}$ and two negative threshold voltage $V_{TH1}$ and $V_{TH2}$. These two threshold are determined to satisfy a relation of $V_{TH1} < V_{TH2} < 0$. For example, $V_{TH1} = -50$ mV, and $V_{TH2} = -10$ mV. The pulse generator sets the pulse signal at one level for turning-on the synchronous rectifier transistor M2 (ON-level, high level for example) when the drain-source voltage $V_{DS}$ becomes lower than the negative first threshold voltage $V_{TH1}$. Then, the pulse generator sets the pulse signal at another level for turning-off the synchronous rectifier transistor M2 (OFF-level, low level for example) when the drain-source voltage $V_{DS}$ becomes higher than the negative second threshold voltage $V_{TH2}$. The driver circuit drives the synchronous rectifier transistor M2 according to the pulse signal generated by the pulse generator.

The feedback IC 400 is provided at the secondary side of the DC/DC converter 200, generates a feedback signal according to the output voltage $V_{OUT}$, and supplies the feedback signal to the controller 202 via the photo coupler 204. The feedback IC 400 includes an error amplifier 410 and an abnormal detection circuit 420, and is packaged in a single module.

The VO terminal of the feedback IC 400 is coupled to receive a voltage detection signal $V_S$ according to the output voltage $V_{OUT}$. The GND terminal is coupled to a ground line of the secondary side of the transformer T1. The photo coupler connection (PC) terminal is coupled to the cathode of a light emitting device of the photo coupler 204.

The error amplifier 410 is coupled to amplify an error between the voltage detection signal $V_S$ according to the output voltage $V_{OUT}$ of the DC/DC converter 200 and a target voltage $V_{REF}$. The error amplifier 410 draws (sinks) an error current $I_{ERR}$ according to the error from an input side of the photo coupler 204 via the PC terminal. The error amplifier 410 has an output stage having open-collector/open-drain configuration, and a collector/a drain of the transistor 412 of the output stage is coupled to the PC terminal. The differential amplifier 414 controls the base current or gate voltage of the transistor 412 based on the error between the voltage detection signal $V_S$ and the reference voltage $V_{REF}$. In the present embodiment, the diode D2 is inserted between the collector of the transistor 412 and the PC terminal for the purpose of a circuit protection and/or voltage level shift. In one embodiment, the diode D2 may be omitted.

The abnormal detection circuit 420 is structured to detect an abnormal condition in the secondary side of the DC/DC converter 200. The abnormal condition may include, but not limited to, over current condition; over voltage condition; and overheated condition. Further, the detection method is not limited. For example, the over current condition may be detected by comparing the voltage across the synchronous rectifier transistor M2 with a threshold voltage, or by inserting a sense resistor in series with the synchronous rectifier transistor M2 and comparing the voltage drop across the sense resistor with a threshold voltage. The over voltage condition may be detected by monitoring a voltage at the output line of the DC/DC converter 200 or a voltage at an appropriate node, and comparing the monitored voltage with a threshold voltage. The thermal abnormal condition may be detected by using a thermistor. The abnormal detection circuit 420 asserts its output (an abnormal detection signal S4) when detecting any abnormality.

The protection circuit 430 receives the abnormal detection signal S4 from the abnormal detection circuit 420. The protection circuit 430 invalidates the output of the error amplifier 410 when the abnormal detection signal S4 is asserted, in other words, when any abnormality is detected.

For example, the protection circuit 430 generates a certain voltage level which has no relation with the actual output voltage $V_{OUT}$. The voltage level is determined so that the controller 202 generates a switching pulse for controlling the switching transistor M1 with a duty cycle of substantially zero or of very small value. From another point of view, the protection circuit 430 increases the error current $I_{ERR}$ which is drawn from the light emitting diode of the photo coupler 204 via the PC terminal to an amount which has no relation to the output voltage $V_{OUT}$. This amount is determined so that the duty cycle of the switching pulse for controlling the switching transistor M1 generated by the controller 202 becomes substantially zero or very small value.

The protection circuit 430 includes a protection transistor 432 in parallel with the output transistor 412 of the error amplifier 410. The protection transistor 432 is brought into full on state when the abnormal detection signal S4 is asserted (high level). Accordingly, the output of the error amplifier 410 is clamped in the vicinity of the ground potential, and the feedback operation with the error amplifier 410 is invalidated. In another point of view, the current through the protection transistor 432 becomes more dominant than the current through the output transistor 412, and the feedback with the error amplifier 410 is invalidated. While no abnormality occurs and the abnormal detection signal S4 is negated (low level), the protection transistor 432 keeps the off-state and will not affect the feedback.

The above is the configuration of the DC/DC converter 200. Next, description will be made regarding the operation of the DC/DC converter 200.

The voltage detection signal $V_S$ becomes higher than the reference voltage $V_{REF}$, then the error current $I_{ERR}$ drawn by the transistor 412 increases and the feedback current $I_{FB}$ flowing through the photo transistor of the photo coupler 204. The feedback voltage $V_{FB}$ falls, and the duty cycle ratio (on-period) of the switching transistor M1 decreases and the voltage detection signal $V_S$ changes in one direction (fall down) so as to match the reference voltage $V_{REF}$ with feedback. Conversely, the voltage detection signal $V_S$ becomes lower than the reference voltage $V_{REF}$, then the error current $I_{ERR}$ drawn by the transistor 412 decreases and the feedback current $I_{FB}$ flowing through the light receiving device. When the feedback voltage $V_{FB}$ rises, the duty cycle ratio (on-period) of the switching transistor M1 increases and the voltage detection signal $V_S$ changes in the other direction (rise up) so as to match the reference voltage $V_{REF}$ by feedback control. Accordingly, the output voltage $V_{OUT}$ of the DC/DC converter 200 is maintain at its target level.

The DC/DC converter 200 provides the following advantage.

According to the DC/DC converter 200, by integrating the abnormal detection circuit 420 with the feedback IC 400 having the error amplifier 410, the abnormal condition in the secondary side of the DC/DC converter 200 can be detected.

The synchronous rectifier transistor M2 has its body diode between its back gate and its drain. Therefore, turning off the synchronous rectifier transistor M2 is insufficient for circuit protection because the DC/DC converter 200 keeps its operation with a rectification with the body diode. In the present embodiment, the protection circuit 430 invalidates the voltage feedback by the error amplifier 410 and decreases the duty cycle ratio of the switching transistor M1, then the power supplied to the secondary side is reduced and the circuit can be protected.

Figure 1:
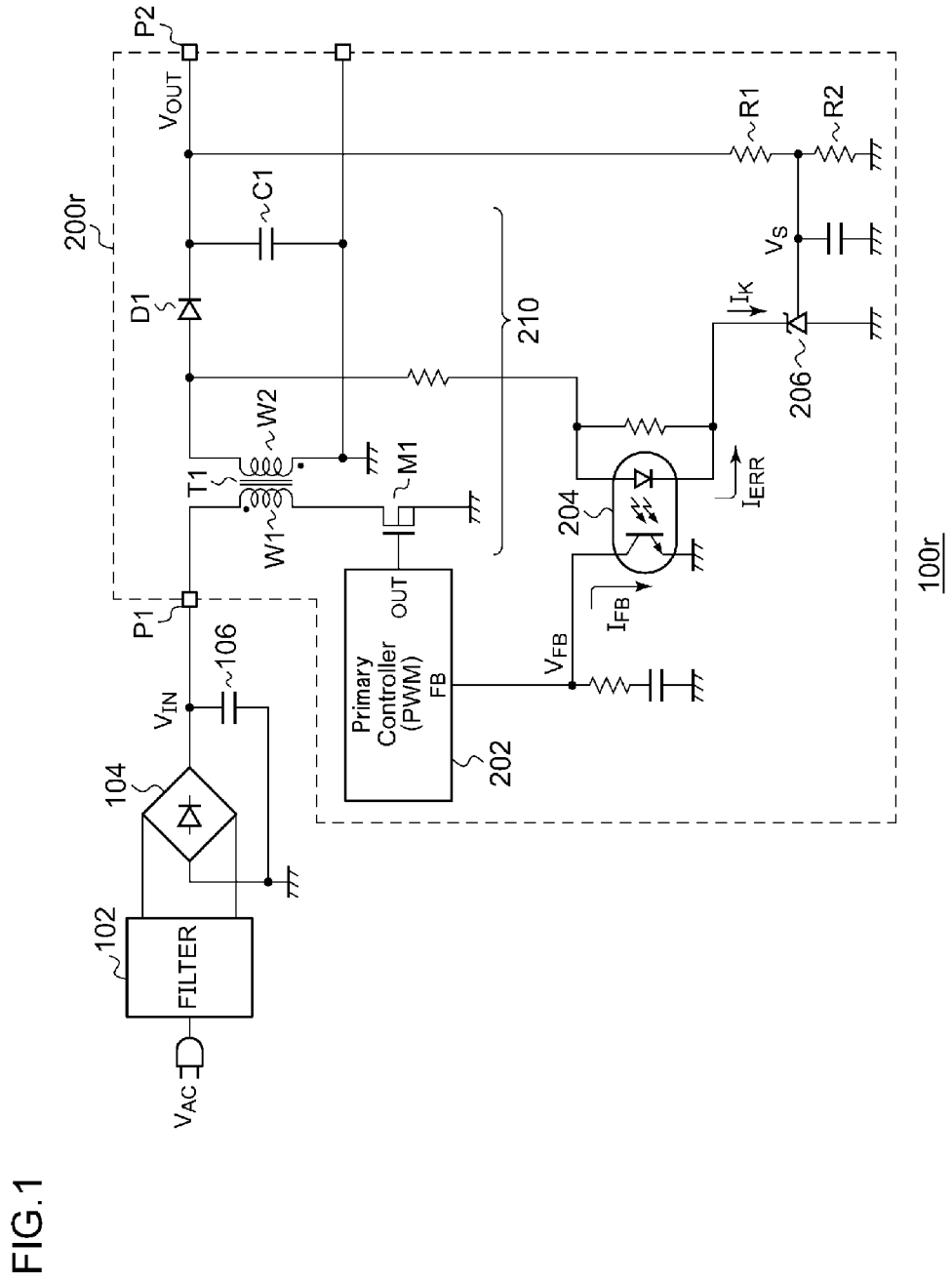
FIG. 1 is a block diagram showing an AC/DC converter investigated by the present inventor.

Further, in the DC/DC converter 200, comparing with a DC/DC converter of FIG. 1 provided with the shunt regulator 206 which is a discrete device, integrating the error amplifier 410 and the abnormal detection circuit 420 on a single semiconductor chip allows to reduce a current consumption of the error amplifier 410 significantly.

The conventional DC/DC converter 200r of FIG. 1 can be implemented with the commercially available shunt regulator 206. Assuming that the current consumption of the shunt regulator 206 is about 700 uA and includes 150 uA of the current flowing through the light emitting device of the photo coupler 204, and the rest 550 uA flows through the shunt regulator 206 as its operation current $I_{DD}$. It is to be noted that the operation current $I_{DD}$ flows through a parallel circuit of the light emitting device and the resistor and it leads a power loss.

To the contrary, in the circuit of FIG. 2, the operation current $I_{DD}$ of the error amplifier 410 can be reduced to about 50 uA even when its output current $I_{ERR}$ is 150 uA, which is the same amount of the shunt regulator 206, and therefore, the efficiency of the DC/DC converter 200, especially in the light load state can be improved.

In one embodiment, the power supply terminal VCC of the synchronous rectifier controller 300 is coupled to the output line of the DC/DC converter 200, and the synchronous rectifier controller 300 operates with the output voltage $V_{OUT}$ as its power supply voltage (for example, 24 V). Then the power consumption of the error amplifier 410 is 24 V×200 uA=4.8 mW. Conversely, assuming the same condition, the power consumption of the shunt regulator 206 in FIG. 1 is 24 V×700 uA=16.8 mW, and DC/DC converter 200 of FIG. 2 can reduce its power consumption by 10 mW in comparison with the DC/DC converter 200r of FIG. 1.

Figure 3A:
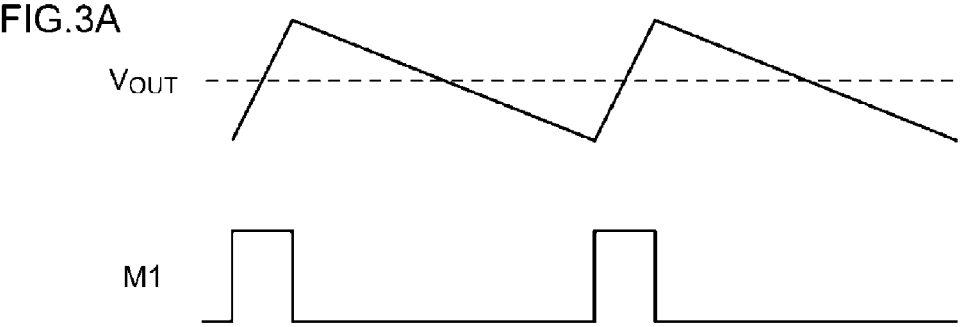
FIG. 3A is a waveform diagram showing the operation of the DC/DC converter in FIG. 2 in the PFM mode.
Figure 3B:
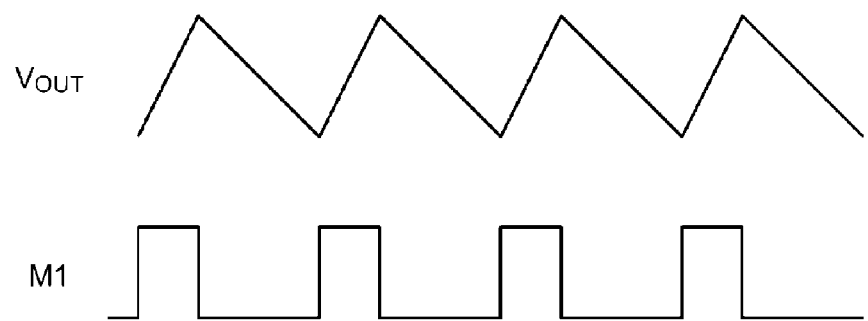
FIG. 3B is a waveform diagram showing the operation of the DC/DC converter in FIG. 1 in the PFM mode.

Further, the synchronous rectifier controller 300 provides the following advantage. In one embodiment, the DC/DC converter 200 may be operate intermittently (referred to as PFM mode) in the light load state. FIG. 3A is a waveform diagram showing the operation of the DC/DC converter 200 in FIG. 2 in the PFM mode. FIG. 3B shows the operation of the DC/DC converter 200r in FIG. 1 in the PFM mode.

In the PFM mode, the switching transistor M1 turns off after it keeps on-state for a certain on-period $T_{ON}$. The output voltage $V_{OUT}$ becomes lower than a threshold in the vicinity of its reference level, then the switching transistor M1 turns on again.

The off-period $T_{OFF}$ of the switching transistor M1 is expressed by the equation below using the capacitance C of the output capacitor C1, a ripple $\Delta V$ of the output voltage $V_{out}$, and a discharge current I from the output capacitor C1.

$$T_{OFF} = C \Delta V / I$$

And the switching period t is given as the expression below.

$$t = (T_{ON} + T_{OFF}) = T_{ON} + C \times \Delta V / I$$

Here, I represents the discharge current from the output capacitor C1, and it is an equivalent of the current consumption of the shunt regulator 206 in FIG. 1 or that of the error amplifier 410 in FIG. 2. Assuming that the capacitance of the output capacitor C1 is 100 uF, the ripple $\Delta V$ is 100 my, and $T_{ON}$=0, the switching period t1 of the DC/DC converter 200r in FIG. 1 and the switching period t2 of the DC/DC converter 200 in FIG. 2 are expressed as below.

$$t1 \approx 100 \text{ uA} \times 100 \text{ mV} / 700 \text{ uA} = 14.28 \text{ ms}$$

$$t2 \approx 100 \text{ uA} \times 100 \text{ mV} / 200 \text{ uA} = 50 \text{ ms}$$

Accordingly, the DC/DC converter 200 of FIG. 2 can lower its switching frequency to one third in comparison with that of the DC/DC converter 200r in FIG. 1 in the light load state. That is, the switching loss required by the controller 202 for charging/discharging the gate of the switching transistor M1 is reduced to one third.

Figure 4:
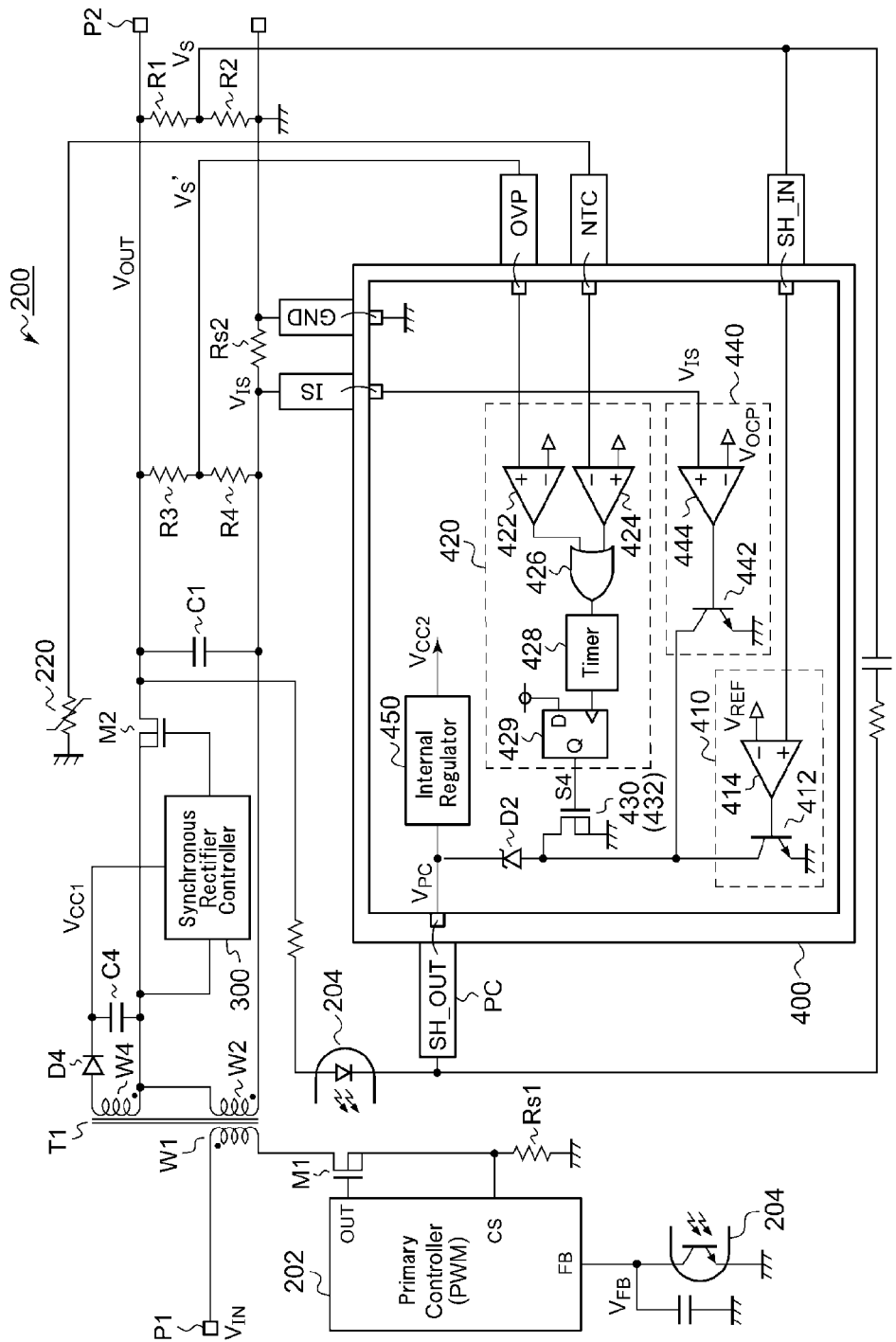
FIG. 4 is a circuit diagram showing a specific configuration of the DC/DC converter in FIG. 2.

FIG. 4 is a circuit diagram showing a specific configuration of the feedback IC 400 in FIG. 2. The abnormal detection circuit 420 includes the OVP (Over Voltage Protection) comparator 422, a temperature protection comparator 424, an OR gate 426, a timer 428, and a flip flop 429. The OVP terminal is supplied with the voltage detection signal $V_S'$ according to the output voltage $V_{OUT}$. The voltage $V_S'$ is generated by dividing the output voltage $V_{OUT}$ with the resistor pair R3 and R4. The OVP comparator 422 compares the voltage $V_S'$ at the OVP terminal with a predetermined threshold, and asserts its output when the over voltage condition is detected.

The NTC terminal is coupled to the thermistor 220 having a NTC (Negative Temperature Coefficient). The thermistor 220 is provided in vicinity of a heat generating body such as the synchronous rectifier transistor M2. The temperature protection comparator 424 compares the voltage across the thermistor 220 with a predetermined threshold and asserts its output when the overheat condition is detected. The OR gate 426 generates logical OR of the outputs of the OVP comparator 422 and the temperature protection comparator 424. The timer 428 applies a trigger to the flip flop 429 when the output of the OR gate 426 is asserted over a period which is longer than a predetermined judgement time, in other words, any abnormality condition occurs for a longer time than the judgement time. The output of the flip flop 429 transits to the high level in response to the trigger and the protection transistor 432 turns on.

The configuration of the abnormal detection circuit 420 is not limited to FIG. 4. The abnormal detection circuit 420 may include either one of the OVP comparator 422 and the temperature protection comparator 424 or may include another abnormal detection means. The circuit may employ an auto restart protection other than timer-latch protection, and the protection method is not limited.

The feedback IC 400 further includes an OCP circuit 440 and an internal regulator 450 in addition to the error amplifier 410, the abnormal detection circuit 420 and the protection circuit 430. The internal regulator 450 receives the voltage $V_{PC}$ at the PC terminal, and supplies each circuit in the feedback IC 400 an internal power supply voltage $V_{CC2}$ which is generated by regulating the voltage $V_{PC}$. In the present embodiment, the diode D2 clamps the voltage at PC terminal above the zener voltage $V_z$, regardless of the state of the transistors 432, 412 and 442. The diode D2 ensures the internal regulator 450 generate the internal power supply voltage $V_{CC2}$ having a predetermined level, and the feedback IC 400 can operate stably.

The OCP circuit 440 has the same structure of the error amplifier 410, and includes a differential amplifier 444 and an output transistor 442. A sense resistor Rs2 is inserted on a path including the secondary winding W2 and the synchronous rectifier transistor M2. One end of the sense resistor Rs2 is grounded, and the other end is coupled to the current sense (IS) terminal of the feedback IC 400. A voltage drop is generated across the sense resistor Rs2 which is proportional to the secondary current through the synchronous rectifier transistor M2. The differential amplifier 444 amplifies an error between the voltage drop across the sense resistor Rs2 (current detection signal) $V_{IS}$ and a predetermined reference voltage $V_{OCP}$, and controls the base current or the gate voltage of the output transistor 442.

In non-over current condition, the current detection signal $V_{IS}$ is below the threshold $V_{OCP}$, and the base current and the collector current of the output transistor 442 are small. In this situation, the OCP circuit 440 does not affect the feedback loop with the error amplifier 410. In the over current condition, the current detection signal $V_{IS}$ increases over the threshold $V_{OCP}$, the base current of the output transistor 442 increases. This lowers the feedback voltage $V_{FB}$ fed back to the controller 202 and the duty ratio of the switching transistor M1, and the power supplied to the load is reduced, and the current protection is achieved. The OCP circuit 440 provides a drooping characteristic in I-V characteristic (output current vs output voltage) of the DC/DC converter 200.

Modifications in the First Embodiment

The synchronous rectifier transistor M2 may be provided at a ground side of the secondary winding W2. In this arrangement, the output voltage $V_{OUT}$ may be supplied to the synchronous rectifier controller 300 as its power supply voltage and the GND terminal of the synchronous rectifier controller 300 may be connected to the ground line of the secondary side of the DC/DC converter 200. In one embodiment, the synchronous rectifier transistor M2 may be built-in inside the synchronous rectifier controller 300.

Second Embodiment

FIG. 5 is circuit diagram of an AC/DC converter 100a according to a second embodiment. In the second embodiment, the feedback IC 400 of FIG. 4 is integrated in the synchronous rectifier controller 300a.

The synchronous rectifier controller 300a includes a driver circuit 302, an error amplifier 410, an OCP circuit 440, an abnormal detection circuit 420, and a protection circuit 430.

The synchronous rectifier transistor M2 is inserted at lower voltage side (ground side) of the secondary winding W2, and the power supply terminal of the synchronous rectifier controller 300a is supplied with the output voltage $V_{OUT}$ of the DC/DC converter 200a. The ground terminal of the synchronous rectifier controller 300a is coupled to the ground line of the DC/DC converter 200a.

The second embodiment provides the same advantage of the first embodiment by integrating the error amplifier 410 and the abnormal detection circuit 420 in the synchronous rectifier controller 300a.

Modifications in the Second Embodiment

The synchronous rectifier transistor M2 may be built-in inside the synchronous rectifier controller 300a.

Third Embodiment

Figure 6:
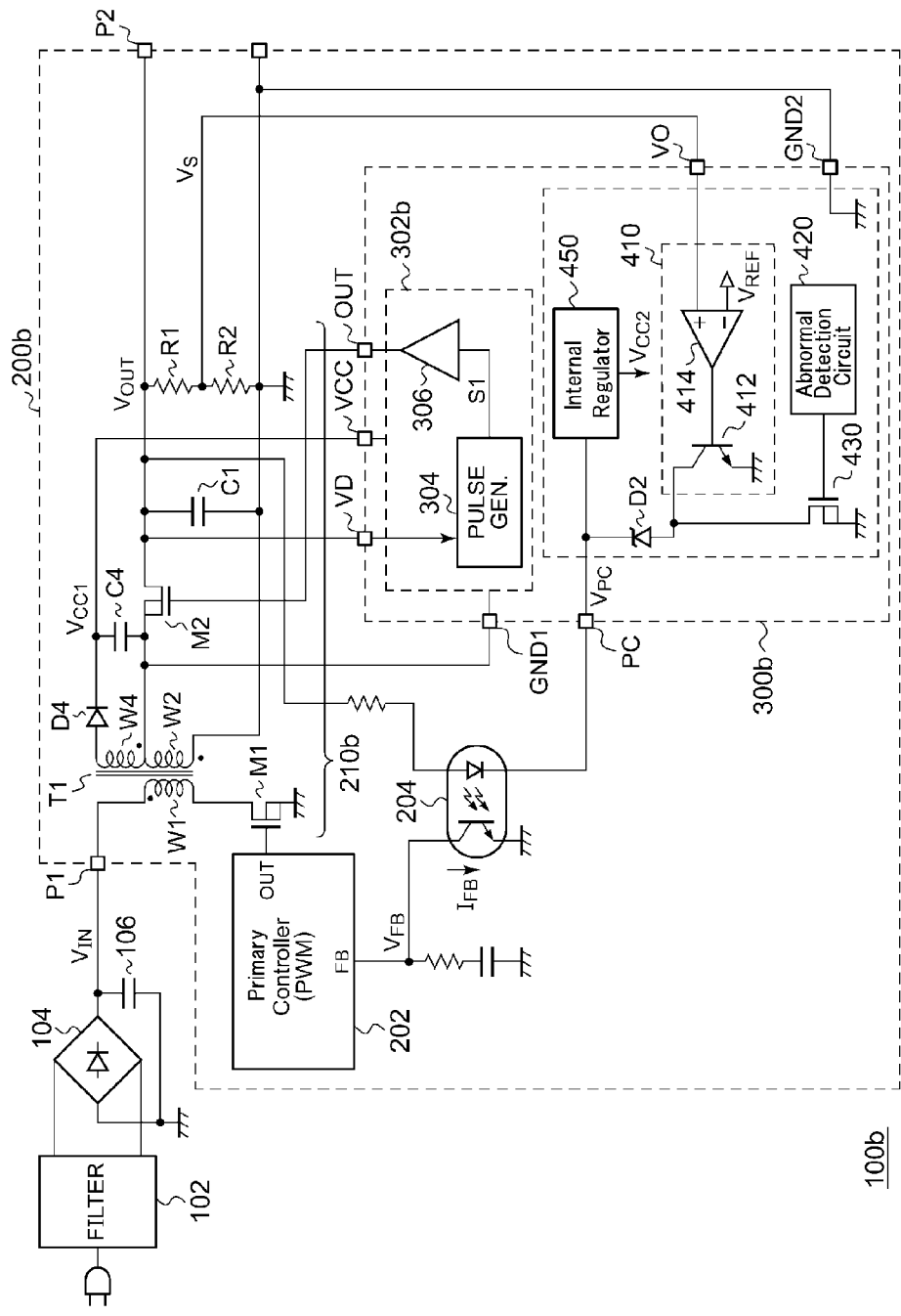
FIG. 6 is a circuit diagram of an AC/DC converter according to a third embodiment.

FIG. 6 is a circuit diagram of an AC/DC converter 100b according to a third embodiment. The synchronous rectifier transistor M2 is provided at the higher voltage side of the secondary winding W2 of the transformer T1.

The synchronous rectifier controller 300b includes a driver circuit 302b, an error amplifier 410, an abnormal detection circuit 420, a protection circuit 430 and an internal regulator 450. The synchronous rectifier controller 300b may further includes an OCP circuit 440. The configurations and the operations of these components are described above.

In the third embodiment, a power supply plane of the driver circuit 302b and a power supply plane of the other circuit blocks are isolated each other, and the ground planes are also isolated. For example, the driver circuit 302d is integrated on the first semiconductor chip (die), and the diode D2, the error amplifier 410, the abnormal detection circuit 420, the protection circuit 430, the OCP circuit 440 and the internal regulator 450 are integrated on the second semiconductor chip, and these are packaged in a single module. In one embodiment, these are integrated on a single semiconductor chip if the process design rule allows two isolated power supply planes and two isolated ground planes in the single chip.

The ground plane of the driver circuit 302b is coupled to the source of the synchronous rectifier transistor M2 via the GND1 terminal. The VD terminal is coupled to the drain of the synchronous rectifier transistor M2.

On the other hand, the ground plane of the error amplifier 410, the abnormal detection circuit 420 and the protection circuit 430 is coupled to the ground at the secondary side via GND2 terminal. Their power supply plane is provided with an internal power supply voltage $V_{CC2}$ that is different from that supplied to the driver circuit 302b. The internal regulator 450 may generate the internal power supply voltage $V_{CC2}$ based on the voltage $V_{PC}$ at the PC terminal.

The third embodiment provides the same advantage of the second embodiment.

Additionally, in the third embodiment, the ground planes and the power supply planes are isolated between the driver circuit 302b and the other circuit block respectively. Therefore, in a platform where the synchronous rectifier transistor M2 is disposed at the high voltage side, the feedback control, abnormal protection and over current protection are available while the driver circuit 302b drives the synchronous rectifier transistor M2 with the source voltage of the synchronous rectifier transistor M2 as its ground plane.

Figure 7:
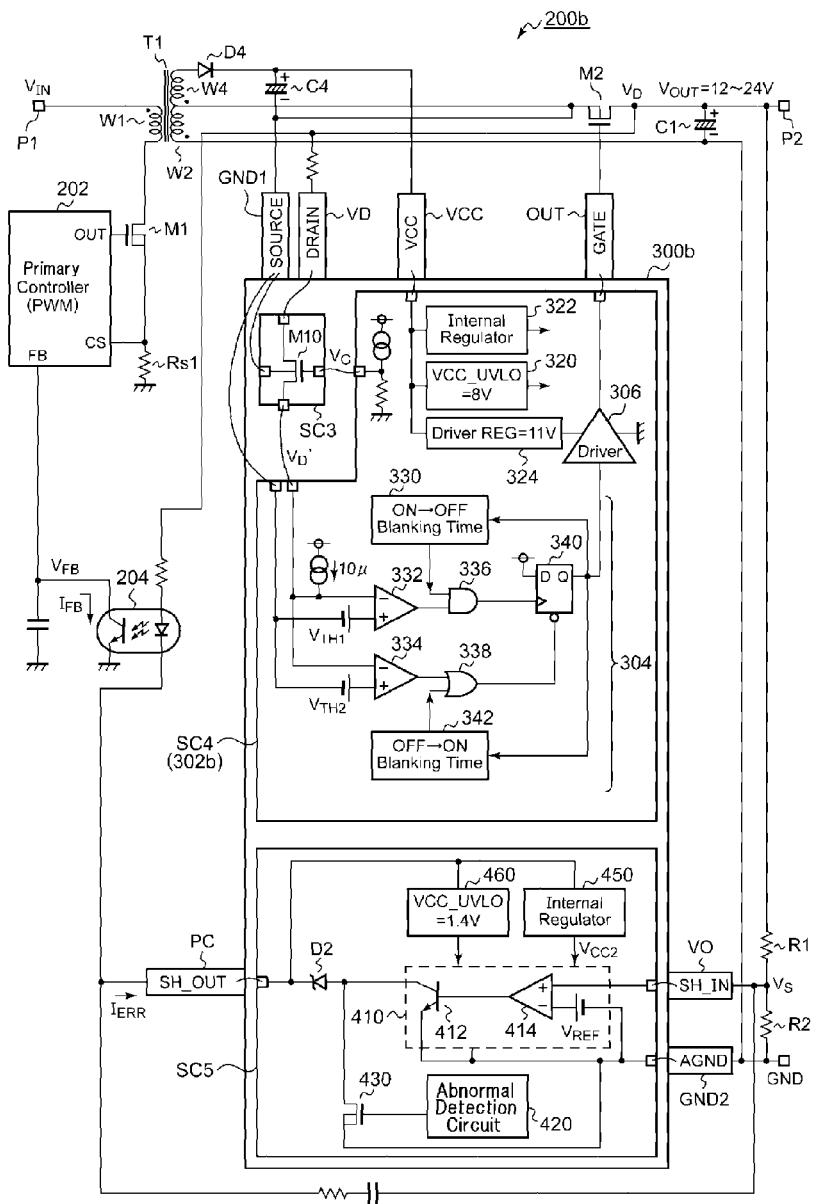
FIG. 7 is a circuit diagram showing a specific configuration of the synchronous rectifier controller in FIG. 6.

FIG. 7 is a circuit diagram showing a specific configuration of the synchronous rectifier controller 300b in FIG. 6. A sense resistor Rs1 is provided in series with the switching transistor M1 at the primary side of the transformer T1. The controller 202 monitors the primary current according to the voltage drop across the sense resistor Rs1. The primary current may be used for current-mode switching and/or an over current protection. The configuration of the controller 202 is not limited, and it may include a pulse modulator with peak-current mode, average-current mode or off-period fixed mode.

Next, description will be made below regarding the synchronous rectifier controller 300b. The synchronous rectifier controller 300b includes three semiconductor chips SC3, SC4 and SC5. The semiconductor chip SC3 is fabricated with the high-voltage process, and includes a transistor M10 configured as FET, and its gate is supplied with a predetermined bias voltage $V_c$, and clamps the drain voltage $V_D$ of the synchronous rectifier transistor M2. The clamped voltage $V_D'$ by the transistor M10 is supplied to the set comparator 332 and the reset comparator 334. The semiconductor chip SC4 corresponds to the driver circuit 302b of FIG. 6, and includes the pulse generator 304 and driver 306.

The driver circuit 302 includes an UVLO (Under-Voltage Lockout) circuit 320, an internal regulator 322, and a regulator 324 for the driver in addition to the pulse generator 304 and the driver 306. The UVLO circuit 320 shuts down the driver circuit 302 when the voltage at VCC terminal becomes lower than a threshold (3V). The internal regulator 322 receives the voltage at the VCC terminal and supplies a regulated voltage to other circuits. The regulator 324 for the driver receives the voltage at the VCC terminal and supplies a regulated power supply voltage to the driver 306.

The pulse generator 304 includes a blanking circuit 330, a set comparator 332, a reset comparator 334, an AND gate 336, an OR gate 338, a flip-flop 340, and a blanking circuit 342.

A high voltage clamp circuit (unshown) may be provided between the drain of the synchronous rectifier transistor M2 and the input terminals (−) of the set comparator 332 and the reset comparator 334. The set comparator 332 compares the drain-source voltage $V_{DS}$ of the synchronous rectifier transistor M2 with the first threshold voltage $V_{TH1}$ (=−50 mV). When $V_{DS}<V_{TH1}$, an output of the set comparator 332 is asserted (high-level), an output (pulse signal) S1 of the flip-flop 340 changes to the on-level (high).

The reset comparator 334 compares the drain-source voltage $V_{DS}$ of the synchronous rectifier transistor M2 with the second threshold voltage $V_{TH2}$ (=−10 mV). When $V_{DS}>V_{TH2}$ an output of the reset comparator 334 is asserted (low-level), the flip-flop 340 is reset, and its output S1 changes to off-level (low).

The blanking circuits 330 and 342 masks the set pulse from set comparator 332 and the reset pulse from reset comparator 334 respectively while the drain voltage $V_D$ of the synchronous rectifier transistor M2 fluctuates due to noise. The blanking (mask) periods of the blanking circuits 330 and 342 can be adjusted according to external resistors R11 and R12 coupled to T_BLANK1 terminal and T_BLANK2 terminal respectively. The AND gate 336 generates the logical AND of the set pulse and the output of the blanking circuit 330 so as to mask the set pulse. Similarly, the OR gate 338 generate the logical OR of the reset pulse and the output of the blanking circuit 342 so as to mask the reset pulse.

On the semiconductor chip SC5, the error amplifier 410, the abnormal detection circuit 420, the protection circuit 430, the internal regulator 450, and an UVLO circuit 460 are integrated. The UVLO circuit 460 compares a voltage at the PC terminal (SH_OUT pin) with a predetermined threshold voltage (1.4 V), and stops the circuits on the semiconductor chip SC5 when the UVLO state is detected. The internal regulator 450 receives the voltage at the PC terminal and supplies the error amplifier 410e and the abnormal detection circuit 420 with an internal power supply voltage $V_{CC2}$ which is regulated. In the present embodiment, the diode D2 clamps the voltage at PC terminal above the zener voltage $V_z$, regardless of the state of the transistor 312. The diode D2 ensures the internal regulator 450 generate the internal power supply voltage $V_{CC2}$ having a predetermined level, and the semiconductor chip SC5 can operate stably.

Fourth Embodiment

Figure 8:
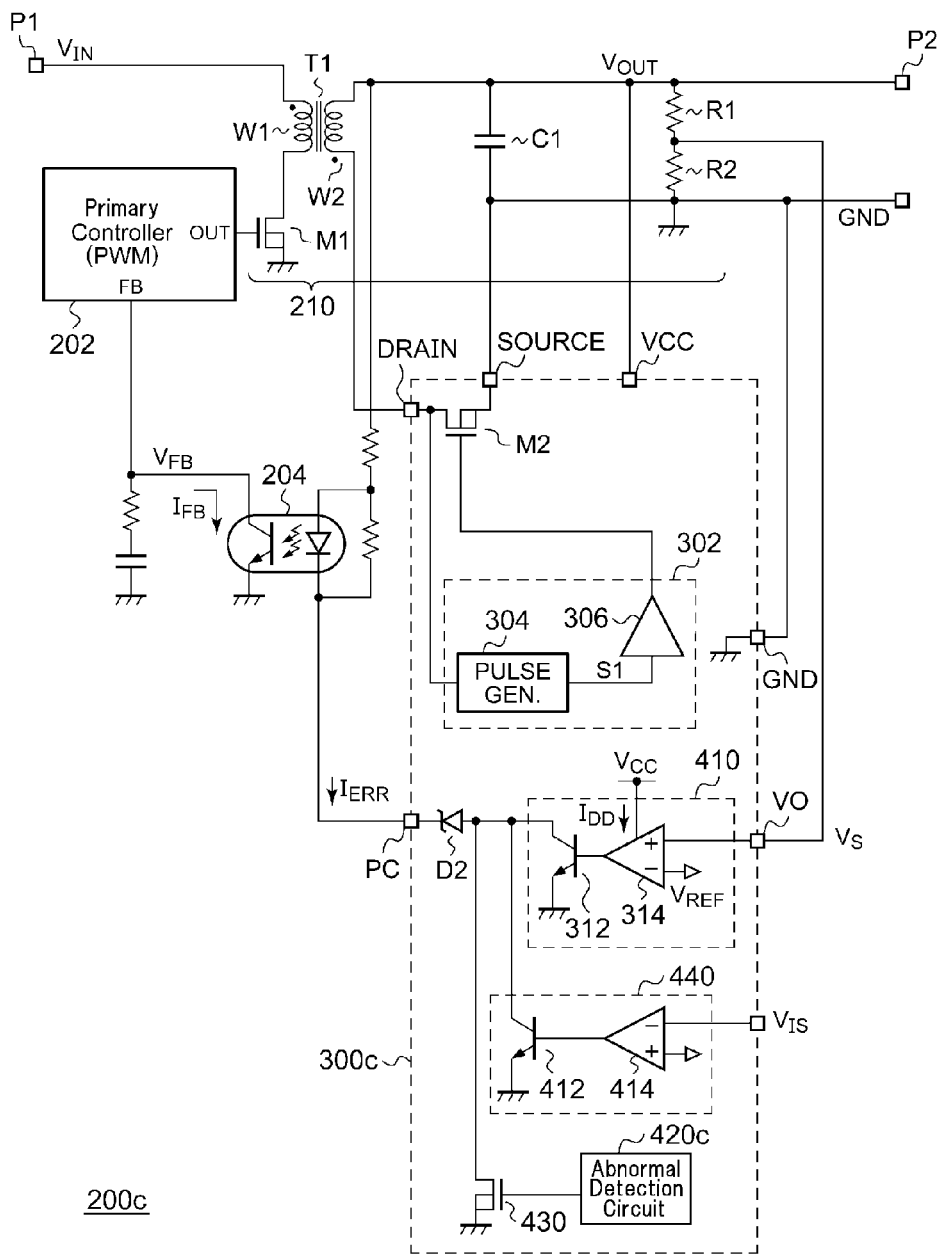
FIG. 8 is a block diagram showing a DC/DC converter including the synchronous rectifier controller according to the fourth embodiment.

FIG. 8 is a block diagram showing a DC/DC converter 200c including the synchronous rectifier controller 300c according to the fourth embodiment. The synchronous rectifier transistor M2 is configured as a built-in component of the synchronous rectifier controller 300c.

The abnormal detection circuit 420c monitors the temperature of the synchronous rectifier transistor M2, and detects the overheated condition. As shown in FIG. 4, in the configuration where the synchronous rectifier transistor M2 is an external component, its temperature is monitored by using the thermistor 220 which is also an external component, and the overheated condition can be detected. On the other hand, as shown in FIG. 8, the synchronous rectifier transistor M2 is built-in inside the synchronous rectifier controller 300c, the temperature detection circuit is formed on the semiconductor substrate and no external thermistor is necessary.

Figure 9A:
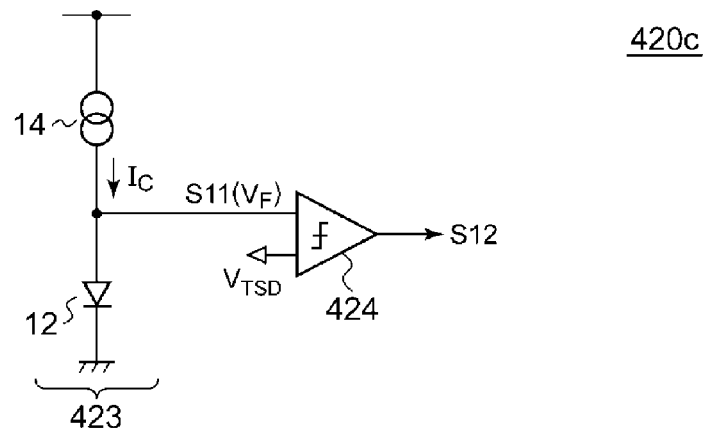
FIGS. 9A and 9B are circuit diagrams showing the specific configurations of the abnormal detection circuit in FIG. 8.
Figure 9B:
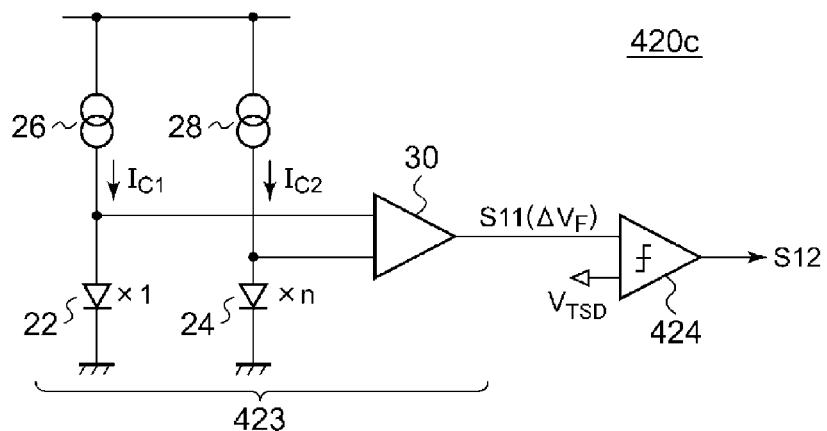

FIGS. 9A and 9B are circuit diagrams showing the specific configurations of the abnormal detection circuit 420c in FIG. 8. In FIGS. 9A and 9B, portions for detecting the overheated condition are shown. The abnormal detection circuit 420c includes the temperature detection circuit 423 and the temperature protection comparator 424. The temperature detection circuit 423 generates a detection signal S11 indicative of the temperature. The temperature protection comparator 424 compares the detection signal S11 with a predetermined threshold $V_{TSD}$, and asserts the protection signal S12 when the temperature exceeds a threshold. The temperature detection circuit 423 senses the temperature by using the temperature dependence of the forward voltage Vf of a diode which is a temperature sensing element.

The temperature detection circuit 423a in FIG. 9A includes the diode 12 and the current source 14 which supplies a constant current Ic to the diode 12, and output the forward voltage (voltage drop) Vf of the diode 12 as the detection signal S11. The voltage Vf is represented in the expression (1). The diode may be configured using the base-emitter junction of the bipolar transistor and Vf may be rewritten as Vbe. These are equivalent.

$$Vf = V_T \times \ln(Ic/I_S)$$

$$V_T = kT/q \qquad (1)$$

T, k, q and $I_S$ represents temperature, Boltzmann constant, elementary charge, saturation current respectively. It is to be noted that the saturation current $I_S$ depends on the temperature. The temperature detection circuit 423a in FIG. 9A has CTAT (Complimentary To Absolute Temperature).

The temperature detection circuit 423b includes diodes 22, 24, current sources 26, 28 which supply constant currents Ic1 and Ic2 to the diodes 22, 24 respectively, and an amplifier 30. The current density of the diode 24 is 1/n of the current density of the diode 22. In one embodiment, Ic1=Ic2 and the size of the diode 24 is n-times larger than the size of the diode 22. In one embodiment, the sizes of the diodes 22 and 24 are same, and Ic1=n×Ic2.

The temperature detection circuit 423b outputs the difference ΔVf (=Vf1−Vf2) between the forward voltages of the two diodes 22 and 24. The difference ΔVf is represented in the expression (2) and has a PTAT (Proportional to Absolute Temperature).

$$\Delta Vf = Vf1 - Vf2 = V_T \times \ln(n) \quad (2)$$

The expression (2) shows that the temperature detection circuit 423b in FIG. 9B is less subjected to the variation of Ic and/or $I_s$ than the temperature detection circuit 423a in FIG. 9A.

Figure 10:
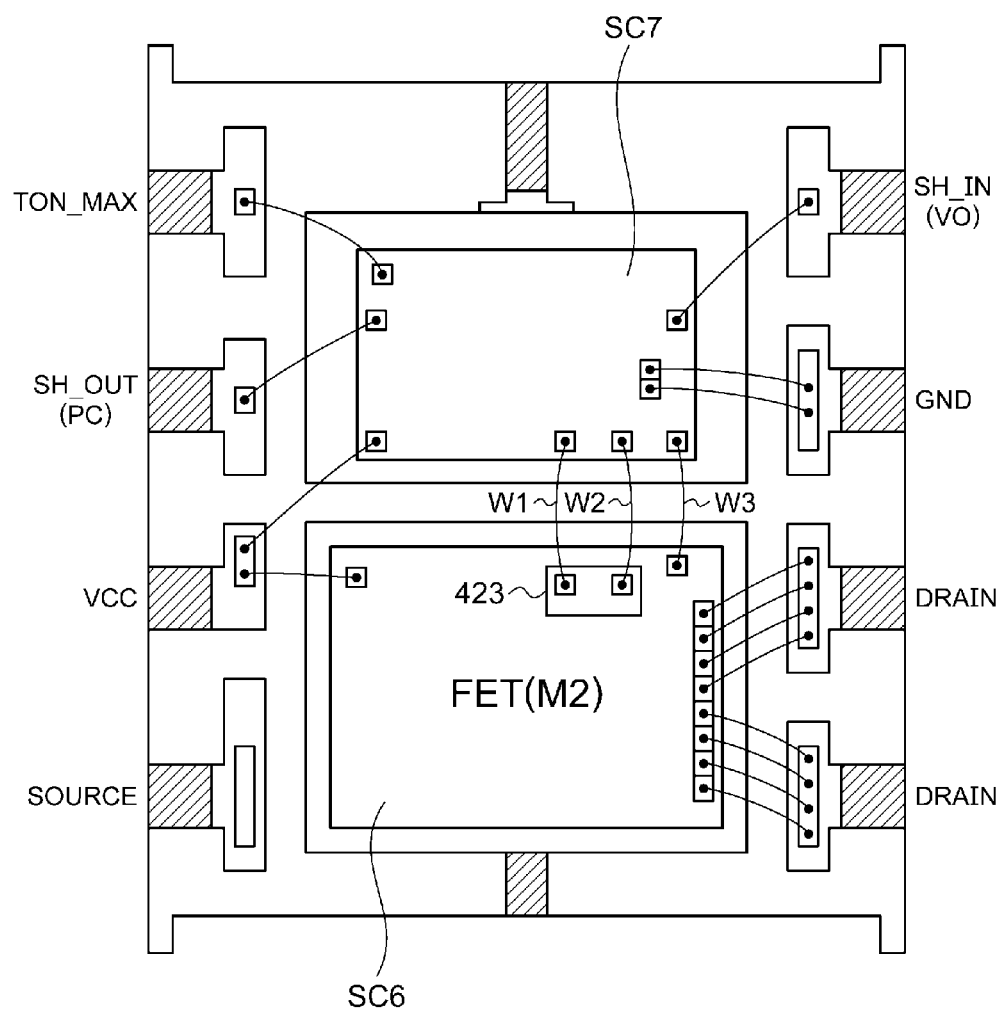
FIG. 10 is a circuit diagram showing a specific configuration of the synchronous rectifier controller of FIG. 8.

FIG. 10 is a circuit diagram showing a specific configuration of the synchronous rectifier controller 300c of FIG. 8. The synchronous rectifier controller 300c has two semiconductor chips (dice) SC6 and SC7. On the semiconductor chip SC6, the synchronous rectifier transistor M2 and a part of or whole part of the temperature detection circuit 423a (423b) are integrated. The temperature detection circuit 423a (423b) includes the diodes 12 (22, 24) as shown in FIGS. 9A and 9B, and at least the diodes 12 (22, 24) is/are integrated on the semiconductor chip SC6.

Regarding the temperature detection circuit 423a of FIG. 9A, the current source 14 is preferably integrated on the semiconductor chip SC6. In one embodiment, it may be integrated on the semiconductor chip SC7.

Regarding the temperature detection circuit 423b of FIG. 9B, the current source 26, 28 are integrated on the semiconductor chip SC6, and the amplifier 30 is integrated on the semiconductor chip SC7. In one embodiment, the current source 26, 28 and the amplifier 30 may be integrated on the semiconductor chip SC6. In another embodiment, the current source 26, 28 and the amplifier 30 may be integrated on the semiconductor chip SC7.

With the layout of FIG. 10, the temperature detection circuit 423a in FIG. 9A is adopted, and its diode 12 is integrated on the semiconductor chip SC6. The bonding wires W1 and W2 are connected to the anode and the cathode of the diode 12. The bonding wire W3 couples an output of the driver 306 on the semiconductor chip SC7 and the gate of the synchronous rectifier transistor M2 on the semiconductor chip SC6.

To the TON_MAX terminal, a circuit component such as a resistor and a capacitor is coupled for setting the maximum on period of the switching transistor M1. The TON_MAX terminal may be used for another function.

When the overheated condition is detected in the synchronous rectifier controller 300c, switching operation of the switching transistor M1 is stopped in response to a notification from the controller 202 via the photo coupler 204.

The advantage of the third embodiment is understood by making comparison with a comparison technology where all part of the temperature detection circuit 423 are integrated on the semiconductor chip SC7. The temperature of the semiconductor chip SC7 rise first because the synchronous rectifier transistor M2 is a dominant heat body, then the temperature of the semiconductor chip SC6 rise due to the heat conduction via the package. If the temperature detection circuit 423 is integrated on the semiconductor chip SC6, it detects the temperature of the synchronous rectifier transistor M2 late and/or incorrectly. In contrast, in the third embodiment, the temperature sensing element of the temperature detection circuit 423, i.e. the diode(s) 12 (22,24) is/are integrated on the semiconductor chip SC7 together with the synchronous rectifier transistor M2, the device temperature of the synchronous rectifier transistor M2 can be detected rapidly and correctly.

Figure 11:
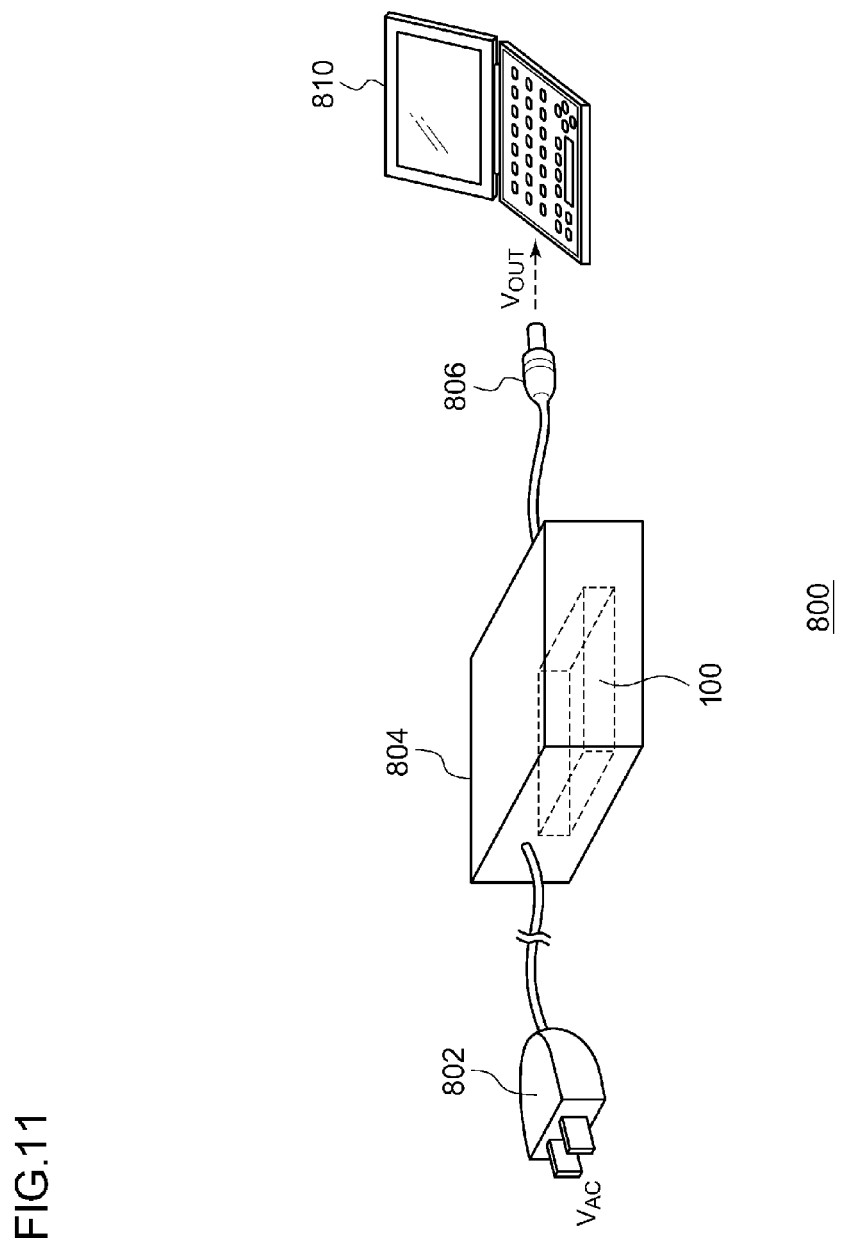
FIG. 11 is a diagram showing an AC adaptor provided with the AC/DC converter.

Next, description will be made regarding the usage of the DC/DC converter 200. FIG. 11 is a diagram showing an AC adapter 800 including the AC/DC converter 100. The AC adapter 800 includes a plug 802, a casing 804, and a connector 806. The plug 802 receives commercial AC voltage $V_{AC}$ from an unshown outlet. The AC/DC converter 100 is mounted within the casing 804. The DC output voltage $V_{OUT}$ generated by the AC/DC converter 100 is supplied to an electronic device 810 via the connector 806. Examples of such an electronic device 810 include laptop PCs, digital still cameras, digital video cameras, cellular phones, portable audio players, and the like.

Figure 12A:
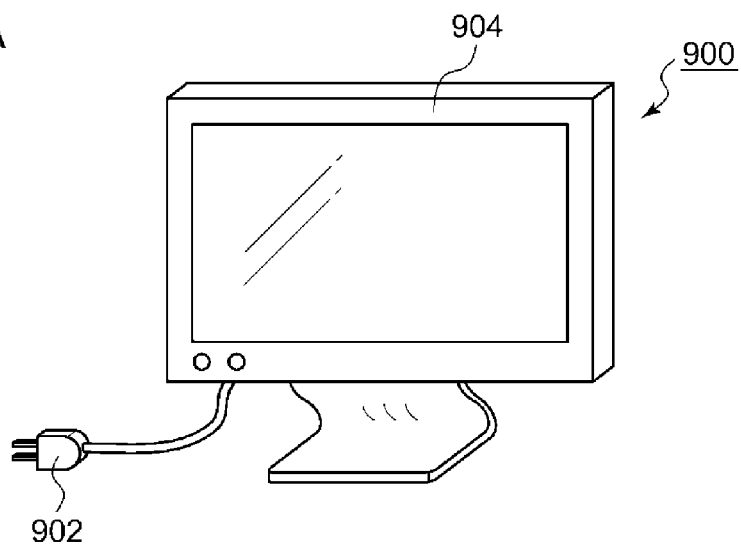
FIGS. 12A and 12B show electronic devices provided with the AC/DC converter.
Figure 12B:
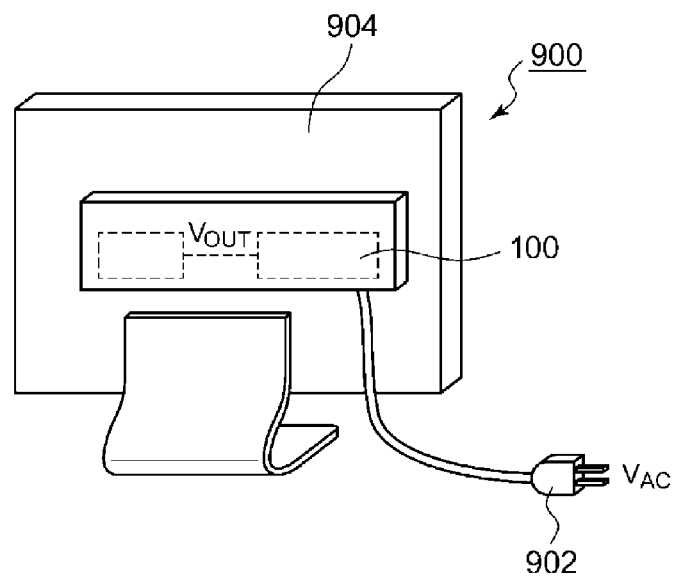

FIGS. 12A and 12B are diagrams each showing an electronic device 900 including the AC/DC converter 100. The electronic device 900 shown in FIGS. 12A and 12B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc. The plug 902 receives commercial AC voltage $V_{AC}$ from an unshown outlet. The AC/DC converter 100 is mounted within the casing 904. The DC output voltage $V_{OUT}$ generated by the AC/DC converter 100 is supplied to a load mounted in the same casing 904. Examples of such a load include microcomputers, DSPs (Digital Signal Processors), lighting devices, analog circuits, digital circuits, and the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

(1st Modification)

In the embodiments, the present invention may be applied not only to flyback converter, but also forward converter. In the forward converter, plural synchronous rectifying transistors are provided at the secondary side of the transformer T1. In this modification, the synchronous rectifier controller may include the driver circuit 302 configured to switch the plural synchronous rectifying transistors and error amplifier 410, which are integrated in a single package. Otherwise, combination of plural synchronous rectifier controllers in FIG. 2, FIG. 4 or FIG. 5 may support the forward converter. The converter may be a QR (Quasi-Resonant) converter.

(2nd Modification)

At least one of the switching transistor and the synchronous rectifier transistor may be configured as a bipolar transistor or IGBT.

(3rd Modification)

In the embodiments, the protection circuit 430 includes the protection transistor 432, but the structure of the protection circuit 430 is not limited to this. The protection circuit 430 is structured (1) to invalid the output of the error amplifier 410, and (2) to change the feedback voltage $V_{FB}$ toward the controller 202 so as to shorten the on period (duty cycle) of the switching transistor M1. For example, in FIG. 2, the protection circuit 430 may include a switch (transistor) provided between a power supply line (high voltage line) and the output transistor 412. By turning on the switch in response to the assertion of the abnormal detection signal S4, the voltage feedback operation by the error amplifier 410 is invalidated, and the on period of the switching transistor M1 becomes shorter.

(4th Modification)

In the first embodiment (FIGS. 2 and 4), the abnormal detection circuit 420 and the protection circuit 430 are integrated together with the error amplifier 410, and in the second and the third embodiments (FIGS. 3-7), the abnormal detection circuit 420 and protection circuit 430 are integrated on the synchronous rectifier controller 300a. However, the present invention is not limited to these. In one embodiment, the synchronous rectifier controller 300, the error amplifier 410, the abnormal detection circuit 420 and the protection circuit 430 are integrated on several ICs separately. The error amplifier 410 may be configured as the shunt regulator, and the transistor of the protection circuit 430 may be an external discrete component.

(5th Modification)

In the third embodiment, the error amplifier 410 is built-in inside the synchronous rectifier controller 300c. In this arrangement, the error amplifier 410 may be integrated on the other semiconductor chip rather than the semiconductor chip SC6, SC7. Otherwise, the error amplifier 410 may be a shunt regulator in a separate package from the synchronous rectifier controller 300.

While the preferred embodiments of the present invention have been described using specific terms, such description is for illustrative purposes only, and it is to be understood that changes and variations may be made without departing from the spirit or scope of the appended claims.

What is claimed is:

1. A feedback circuit provided on a secondary side of an insulation-type synchronous DC/DC converter, wherein the insulation-type synchronous DC/DC converter comprises:
   a transformer having a primary winding and a secondary winding;
   a switching transistor coupled to the primary winding of the transformer;
   a synchronous rectifier transistor coupled to the secondary winding of the transformer;
   a feedback photo coupler;
   a primary controller coupled to an output side of the feedback photo coupler, and structured to control the switching transistor according to a feedback signal from the feedback photo coupler;
   a synchronous rectifier controller structured to control the synchronous rectifier transistor; and
   the feedback circuit coupled to an input side of the feedback photo coupler, and wherein
   the feedback circuit comprises:
   a photo coupler connection terminal to be coupled to the input side of the feedback photo coupler;
   an error amplifier structured to amplify an error between a voltage detection signal according to an output voltage of the DC/DC converter and a target voltage, and to draw a current having an amount according to the error, from the input side of the feedback photo coupler via the photo coupler connection terminal;
   an abnormal detection circuit structured to detect at least one of an over voltage condition and an overheated condition in the secondary side and to assert an abnormal detection signal when an abnormal condition in the secondary side of the DC/DC converter is detected;
   a protection circuit coupled to the photo coupler connection terminal, and structured to, in response to assertion of the abnormal detection signal, increase a current that is drawn from the feedback photo coupler via the photo coupler connection terminal to an amount which has no relation to an output of the error amplifier, so that a feedback operation by the error amplifier is invalid and an on-period of the switching transistor is shorten, and wherein the feedback circuit is packaged in a single module; and
   an over current protection circuit structured to amplify an error between a current detection signal according to a secondary current flowing in the secondary side of the DC/DC converter and an upper limit level of the current detection signal and to draw a current having an amount according to the error, from the input side of the feedback photo coupler via the photo coupler connection terminal,
   and wherein the over current protection circuit is separate from the abnormal detection circuit and the protection circuit.

2. The feedback circuit according to claim 1, wherein the error amplifier comprises:
   a differential amplifier structured to amplify the error between the voltage detection signal and the target voltage; and
   a first output transistor having a base/a gate receiving an output signal of the differential amplifier, an emitter/a source connected to the ground, and a collector/a drain connected to the photo coupler connection terminal,
   and wherein the protection circuit includes a second output transistor having a base/a gate receiving the abnormal detection signal, an emitter/a source connected to the ground, and a collector/a drain connected to the photo coupler connection terminal.

3. The feedback circuit according to claim 2, further comprising:
   a diode provided between the collector/the drain of the first output transistor and the photo coupler connection terminal; and
   an internal regulator coupled to receive a voltage at the photo coupler connection terminal and to generate an internal power supply voltage.

4. A power supply apparatus comprising:
   a filter structured to filter a commercial AC voltage;
   a diode rectifier circuit structured to full-wave rectify an output voltage of the filter;
   a smoothing capacitor coupled to smooth an output voltage of the diode rectifier circuit, so as to generate a DC input voltage; and
   the insulation-type synchronous DC/DC converter configured to step down the DC input voltage, and to supply the DC input voltage thus stepped down to a load;
   wherein the insulation-type synchronous DC/DC converter comprises the feedback circuit according to claim 1.

5. An electronic device comprising:
   a load;
   a filter structured to filter a commercial AC voltage;
   a diode rectifier circuit structured to full-wave rectify an output voltage of the filter;
   a smoothing capacitor coupled to smooth an output voltage of the diode rectifier circuit, so as to generate a DC input voltage; and the insulation-type synchronous DC/DC converter configured to step down the DC input voltage, and to supply the DC input voltage thus stepped down to the load, wherein the insulation-type synchronous DC/DC converter comprises the feedback circuit according to claim 1.

6. A power supply adapter comprising:
a filter structured to filter a commercial AC voltage;
a diode rectifier circuit structured to full-wave rectify an output voltage of the filter;
a smoothing capacitor coupled to smooth an output voltage of the diode rectifier circuit, so as to generate a DC input voltage; and
the insulation-type synchronous DC/DC converter configured to step down the DC input voltage, and to generate the DC input voltage thus stepped down, wherein the insulation-type synchronous DC/DC converter comprises the feedback circuit according to claim 1.

7. The feedback circuit according to claim 1, wherein the abnormal detection circuit comprises:
a first detection circuit structured to detect the over voltage condition;
a second detection circuit structured to detect the overheated condition; and
a timer circuit structured to assert the abnormal detection signal when at least one of the over voltage condition and the overheated condition occurs for a longer time than a predetermined time.

8. The feedback circuit according to claim 7, wherein the timer circuit comprises:
a flip flop wherein its output is the abnormal detection signal; and
a timer structured to apply a trigger to the flip flop when at least one of the over voltage condition and the overheated condition occurs for a longer time than the predetermined time.

9. The feedback circuit according to claim 1, wherein the feedback circuit, the synchronous rectifier controller and the synchronous rectifier transistor are packaged in the single module, and the single module includes a transistor configured as FET having its gate supplied with a predetermined bias voltage and one end coupled to a drain of the synchronous rectifier transistor, and a voltage at another end of the transistor is used to generate a gate signal of the synchronous rectifier transistor.

10. The feedback circuit according to claim 1, wherein the feedback circuit, the synchronous rectifier controller and the synchronous rectifier transistor are packaged in the single module, and the single module comprises two drain pins which are commonly coupled to the drain of the synchronous rectifier transistor.

11. The feedback circuit according to claim 10, wherein the single module is further comprises:
a first pin to be coupled to determine a maximum on-time of the synchronous rectifier transistor;
a second pin which is the photo coupler connection terminal;
a third pin to be coupled to receive a power supply voltage;
a fourth pin coupled to a source of the synchronous rectifier transistor;
a fifth pin to be coupled to receive the voltage detection signal;
a sixth pin to be coupled to an external ground, wherein the first pin to the fourth pin are provided along with one side of a package of the single module, and the fifth pin, the sixth pin and the two drain pins are provided along with another side of a package of the single module.

12. An insulation-type synchronous DC/DC converter comprising:
a transformer having a primary winding and a secondary winding;
a switching transistor coupled to the primary winding of the transformer;
a synchronous rectifier transistor coupled to the secondary winding of the transformer;
a feedback photo coupler;
a primary controller coupled to an output side of the feedback photo coupler, and structured to control the switching transistor according to a feedback signal from the feedback photo coupler;
a synchronous rectifier controller that controls the synchronous rectifier transistor; and
a feedback circuit coupled to an input side of the feedback photo coupler, wherein the feedback circuit comprises:
a photo coupler connection terminal to be coupled to the input side of the feedback photo coupler;
an error amplifier structured to amplify an error between a voltage detection signal according to an output voltage of the DC/DC converter and a target voltage, and to draw a current having an amount according to the error, from the input side of the feedback photo coupler via the photo coupler connection terminal;
an abnormal detection circuit structured to detect at least one of an over voltage condition and an overheated condition in the secondary side and to assert an abnormal detection signal when an abnormal condition in a secondary side of the DC/DC converter is detected;
a protection circuit coupled to the photo coupler connection terminal, and structured to, in response to assertion of the abnormal detection signal, increase a current that is drawn from the feedback photo coupler via the photo coupler connection terminal to an amount which has no relation to an output of the error amplifier, so that a feedback operation by the error amplifier is invalid and an on-period of the switching transistor is shorten, and wherein the feedback circuit is packaged in a single module; and
an over current protection circuit structured to amplify an error between a current detection signal according to a secondary current flowing in the secondary side of the DC/DC converter and an upper limit level of the current detection signal, and to draw a current having an amount according to the error, from the input side of the feedback photo coupler via the photo coupler connection terminal,
and wherein the over current protection circuit is separate from the abnormal detection circuit and the protection circuit.

13. A synchronous rectifier controller provided on a secondary side of an insulation-type synchronous DC/DC converter, wherein the insulation-type synchronous DC/DC converter comprises:
a transformer having a primary winding and a secondary winding;
a switching transistor coupled to the primary winding of the transformer;
a synchronous rectifier transistor coupled to the secondary winding of the transformer;
a feedback photo coupler; and
a primary controller coupled to an output side of the feedback photo coupler, and structured to control the switching transistor according to a feedback signal from the feedback photo coupler, wherein the synchronous rectifier controller comprises:

a driver circuit coupled to drive the synchronous rectifier transistor;

a photo coupler connection terminal coupled to the input side of the feedback photo coupler;

an error amplifier structured to amplify an error between a voltage detection signal according to an output voltage of the DC/DC converter and a target voltage, and to draw a current having an amount according to the error, from the input side of the feedback photo coupler via the photo coupler connection terminal;

an abnormal detection circuit structured to detect at least one of an over voltage condition and an overheated condition in the secondary side and to assert an abnormal detection signal when an abnormal condition in a secondary side of the DC/DC converter is detected; and a protection circuit coupled to the photo coupler connection terminal, and structured to, in response to assertion of the abnormal detection signal, increase a current that is drawn from the feedback photo coupler via the photo coupler connection terminal to an amount which has no relation to an output of the error amplifier, so that a feedback operation by the error amplifier is invalid and an on-period of the switching transistor is shorten, and wherein the synchronous rectifier controller is packaged in a single module; and an over current protection circuit structured to amplify an error between a current detection signal according to a secondary current flowing in the secondary side of the DC/DC converter and an upper limit level of the current detection signal, and to draw a current having an amount according to the error, from the input side of the feedback photo coupler via the photo coupler connection terminal, and wherein the over current protection circuit is separate from the abnormal detection circuit and the protection circuit.

14. The synchronous rectifier controller according to claim 13, wherein the error amplifier comprises:

a differential amplifier that amplifies the error between the voltage detection signal and the target voltage; and a first output transistor having a base/a gate receiving an output signal of the differential amplifier, an emitter/a source connected to the ground, and a collector/a drain connected to the feedback photo coupler connection terminal, and wherein the protection circuit includes a second output transistor having a base/a gate receiving the abnormal detection signal, an emitter/a source connected to the ground, and a collector/a drain connected to the photo coupler connection terminal.

15. The synchronous rectifier controller according to claim 14, further comprising:

a diode provided between the collector/the drain of the first output transistor and the photo coupler connection terminal; and an internal regulator coupled to receive a voltage at the photo coupler connection terminal and to generate an internal power supply voltage.

16. The synchronous rectifier controller according to claim 13, wherein a power supply plane of a set of the abnormal detection circuit and the error amplifier and a power supply plane of the driver circuit are isolated each other, and a ground plane of the set of the abnormal detection circuit and the error amplifier and a ground plane of the driver circuit are isolated each other.

17. The synchronous rectifier controller according to claim 16, wherein the synchronous rectifier transistor is provided at a high voltage side of the secondary winding, and the transformer further comprises an auxiliary winding provided at a secondary side of the transformer, and the DC/DC converter is structured to generate, by using the auxiliary winding, an external power supply voltage with reference to a voltage potential at a line connecting the synchronous rectifier transistor to the secondary winding, and wherein the ground plane of the driver circuit is supplied with the voltage potential at the line, and the power supply plane of the driver circuit is supplied with the external power supply voltage.

18. The synchronous rectifier controller according to claim 17, wherein the power supply plane of the set of the error amplifier and the abnormal detection circuit is supplied with an internal power supply voltage which is generated from a voltage at the photo coupler connection terminal, and the ground plane of the set of the error amplifier and the abnormal detection circuit is supplied with a ground voltage at the secondary side of the DC/DC converter.

* * * * *